No. 694,657. Patented Mar. 4, 1902.
T. G. MELISH.
CORN POPPER.
(Application filed Aug. 16, 1901.)
(No Model.)
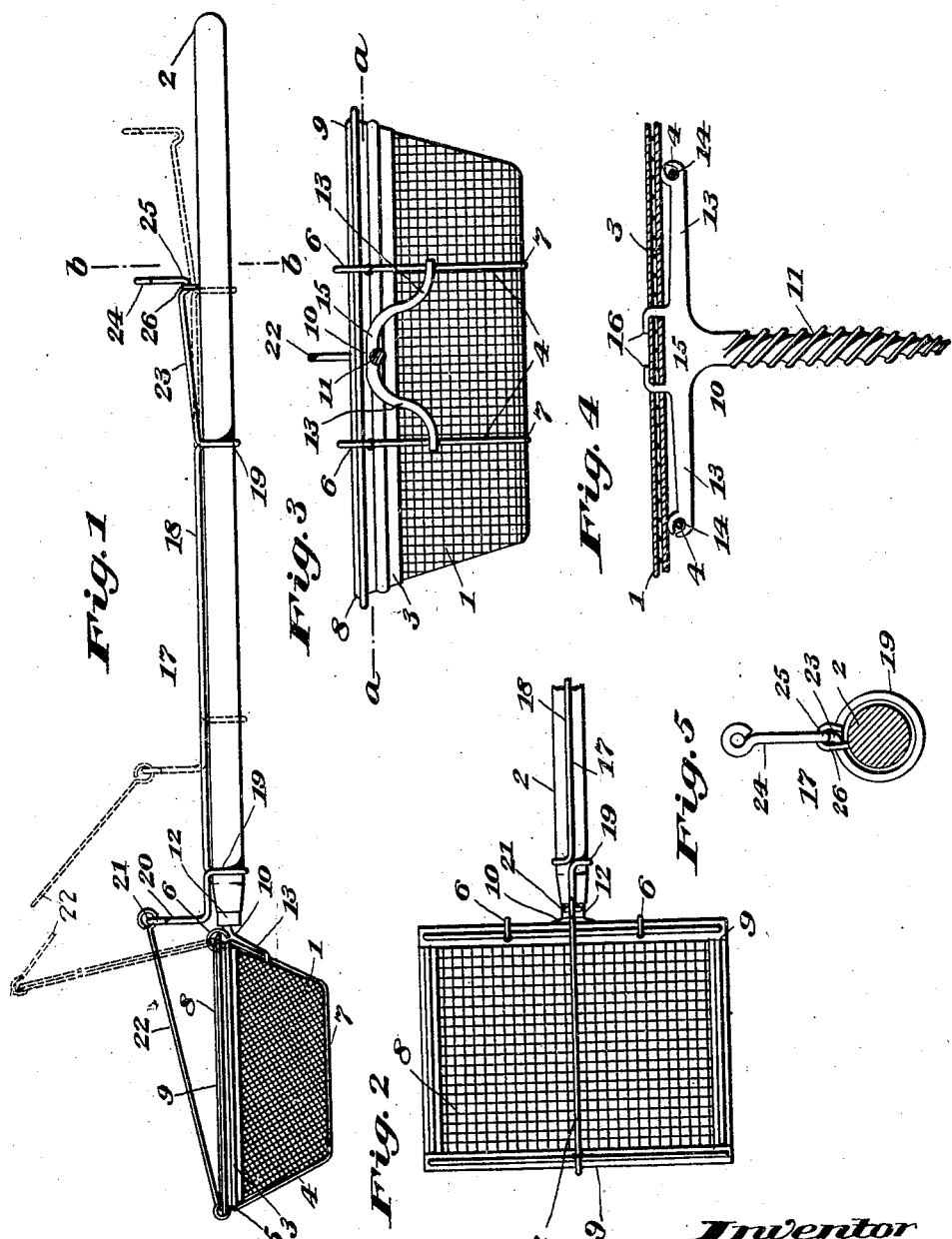
Witnesses
Inventor
Thomas G. Melish,
by John Elias Jones,
his Attorney.

UNITED STATES PATENT OFFICE.

THOMAS G. MELISH, OF CINCINNATI, OHIO.

CORN-POPPER.

SPECIFICATION forming part of Letters Patent No. 694,657, dated March 4, 1902.

Application filed August 16, 1901. Serial No. 72,216. (No model.)

*To all whom it may concern:*

Be it known that I, THOMAS G. MELISH, a citizen of the United States of America, and a resident of Cincinnati, in the county of Hamilton and State of Ohio, have invented certain new and useful Improvements in Corn-Poppers, of which the following is a specification.

This invention relates to certain improvements in corn-poppers, and has for its object to provide a device of this character of a simple and inexpensive nature and of a strong, durable, and improved construction, such that the device is rendered capable of being readily and conveniently manipulated to supply the corn thereto and also for the removal therefrom of the corn after it has been popped.

The invention consists in certain novel features of the construction, combination, and arrangement of the several parts of the improved corn-popper, whereby certain important advantages are attained and the device is made simpler, cheaper, and is otherwise better adapted and made more convenient for use, all as will be hereinafter fully set forth.

The novel features of the invention will be carefully defined in the claims.

In the accompanying drawings, which serve to illustrate my invention, Figure 1 is a side elevation of the improved corn-popper, the lid thereof being shown in closed position; and Fig. 2 is a top view of the improved device, the extremity of the handle being broken away for lack of space. Fig. 3 is an enlarged rear view showing the means for securing the handle to the basket or screen-receptacle of the improved corn-popper. Fig. 4 is an enlarged section taken through the handle-securing means in the plane indicated by line *a a* in Fig. 3. Fig. 5 is a section taken through the handle in the plane indicated by line *b b* in Fig. 1 and showing the means for guiding the lid-actuating slide thereon.

The improved corn-popper comprises a basket or receptacle 1 for the corn, herein shown as formed in rectangular shape from wire screen or netting of a mesh fine enough to hold the unpopped corn, and a handle 2, extended rearwardly behind said basket and preferably of wood in rounded form. The basket has a sheet-metal reinforce 3 extended around its upper edge and is braced and strengthened by transverse wires 4 4, having loops or bends 5 and 6 at their ends passed through the reinforce 3 at the front and back, respectively, of the basket for the secure attachment of said wires. The wires 4 have their central portions 7 extended down beneath the bottom of the basket and along the outer sides thereof at its front and rear parts.

The basket 1 has a lid 8 arranged to close over its open top, and said lid is also, as herein shown, formed from wire-netting, but is of a coarser mesh than the body of the basket, so as to permit the unpopped corn to be sifted out from that which has been popped by inverting the basket in a manner readily understood, the mesh of the netting of which the lid 8 is formed being adapted for the passage through it of the unpopped grains of corn. The lid 8 has also a marginal reinforce 9, of sheet metal, for imparting strength and stiffness thereto, and at its rear edge said lid is held in hinged relation with the basket 1 by means of the loops 6 at the rear ends of the brace-wires 4 4, which loops 6 are extended above the upper edge of the reinforce 3 and take through openings produced in the reinforce 9 at the rear edge of the lid.

For holding the basket 1 to the handle 2 of the device a spider or connecting-piece 10 is provided, having a threaded shank 11 engaged with the end of said handle, which latter has a ferrule 12 to prevent it from splintering. The spider or connecting-piece 10 is also formed with lateral downwardly-directed arms 13, apertured, as seen at 14, for the passage of the strengthening-wires 4, above referred to, and above said arms 13 the body portion 15 of the said connecting-piece is made flat to fit against the outer rear face of the basket and is provided with forwardly-directed prongs or parts 16, which are passed through openings in the reinforce 3 at the rear edge of the basket and are bent toward each other inside of the basket, as shown in Fig. 4. The spider or connecting-piece 10 will be, by preference, formed from malleable metal, so that said prongs or parts 16 may be conveniently bent.

For opening and closing the lid 8 I provide a sliding member 17, held for movement longitudinally upon the handle 2, and herein shown as formed from a piece of wire having a straight body portion 18, which is extended along the upper side of the handle and has at its ends circular bights or loops 19 produced in it of a diameter to receive the handle 2, upon which the said member is, by means of said bights or loops, guided for longitudinal sliding movement. At the forward end of the handle 2 of the corn-popper the wire of the member 17 is extended beyond the forward bight or loop 19 and has its extremity bent upward at about a right angle to the handle, as shown at 20, said bent extremity having an eye 21 produced in it and with which is engaged a similar eye on the rear end of a link 22, which extends, when the lid 8 is in closed position, in a downwardly-inclined direction above said lid and has its forward end loosely connected by a similar eye with the reinforce 9 at the forward edge of the said lid. The rear extremity of the wire of which the member 17 is formed is extended behind the rear loop or bight 19 in an upwardly-inclined direction above the handle 2, as shown at 23, and has also at its extremity an upwardly-bent portion 24, which forms a thumb-piece, by means of which the member 17 may be conveniently operated to slide it lengthwise along the handle 2. The said inclined portion 23 is also provided, adjacent to the bent end or thumb-piece 24, with a downwardly-bent portion 25, which forms a catch for engagement with an eye 26 on the rear end of the handle 2 of the corn-popper and through which the inclined portion 23 is passed, the resiliency of the metal wire serving normally to hold the catch engaged with the eye 26 when the member 17 is slid forward to close the lid 8 upon the basket 1. The eye 26 also acts to prevent turning or rotation of the member 17 upon the handle 2, whereby the parts would be deranged and prevented from proper operation.

In using the improved corn-popper when it is desired to open the lid 8 for the removal of the popped corn the thumb-piece 24 at the rear end of the wire member 17 is pressed down, so as to flex the inclined portion 23 against its resiliency and release the catch 25 from the eye 26, whereupon the member 17 is free for rearward sliding movement upon the handle 2, and upon being moved rearwardly thereon acts by its link connection with the lid 8 to swing the same into open position, as indicated in dotted lines in Fig. 1. The resiliency of the inclined rear portion 23 of the member 17 will also cause said portion to travel for a portion of its play in contact with the eye 26, so as to frictionally hold the member against forward movement except when forcibly pressed by the user, so that accidental closing of the lid after it has been opened is prevented. When it is desired to close the lid upon the basket, the operation above described is reversed, except that it is unnecessary to depress the thumb-piece of the sliding member, the catch 25 automatically engaging the eye 26 as the said member is slid forward on the handle 2 and acting upon its engagement with said eye to lock the slide against movement and prevent accidental opening of the lid.

The link 22 by reason of its downward inclination from the upwardly-bent portion 20 of the slide above the lid 8 acts as a brace to hold the lid tightly closed when the slide 17 is moved forwardly on the handle 2, and also insures the proper opening of the lid when the slide is moved rearwardly. The loops or bights 19 also afford a simple and inexpensive means for guiding the slide 17 upon the handle without weakening the latter, and the spider or connecting-piece 10 adds greatly to the strength of the device and prevents spreading of the wires 4 at the bottom of the basket.

From the above description it will be seen that the improved corn-popper constructed according to my invention is of an extremely simple and inexpensive nature and is especially well adapted for use, since it permits of conveniently moving the lid into closed or open position upon the basket without requiring the user to handle the lid, so that burning of the fingers with the hot lid, spilling the corn, and delays in waiting for the parts to cool are altogether avoided. The actuating means for moving the lid also serves to securely hold the same against accidental movement when in either open or closed position, so that much annoyance caused by such accidental movement of the lid is avoided.

It will be observed that the basket is made oblong, with its greatest length transverse to or at right angles with the length of the handle, thus making it more applicable for use in grates (in its sidewise or lateral movements or shaking thereof) during the popping operation. Grates are usually wider than they are deep, and probably the most extensive use of the device is in open fireplaces or grates. The netting of the lid being of coarser mesh than that of the basket permits of conveniently separating the popped from the unpopped grains and also permits the corn to be supplied to the basket to be popped without raising the lid, if desired. It will also be obvious from the above description that the improved corn-popper constructed according to my invention is capable of some modification without material departure from the principles and spirit of the invention, and for this reason I do not wish to be understood as limiting myself to the precise form and arrangement of the several parts as herein set forth.

Having thus described my invention, I claim—

1. In a corn popper, the combination of a basket, a lid movable thereon, a handle, a member movable on the handle and having at its forward end a portion extended upward from the handle and above the lid and at its rear end an integral upwardly-inclined portion provided with a catch at its extremity, a downwardly-directed connection between the upwardly-extended forward portion of the member and said lid, and an eye carried on the handle through which the upwardly-inclined rear portion of the member is passed to hold the member from turning on the handle and which is adapted for engagement with the catch thereof, to hold said member against movement on the handle, substantially as set forth.

2. In a corn-popper, the combination of a basket, a lid movable thereon, a handle having an eye and a wire having its forward end provided with an upwardly-bent portion for connection with the lid for moving the latter and having loops or bights encircling and slidable along the handle to hold the said wire for sliding movement along the same, the rear end of said wire being passed through the eye of the handle to hold it against turning on the handle and being bent upward from the handle and provided with a bend forming an elastic catch for engagement with said eye to lock the wire against movement along the handle, substantially as set forth.

3. In a corn-popper, the combination of a basket formed from wire-netting and having a sheet-metal reinforce extended along its front and rear edges, brace-wires extended across the bottom of the basket with their front and rear ends held in the reinforces along the front and rear edges of the basket, a handle and a connecting-piece between the handle and the basket, said piece having integral portions passed through the reinforce along the rear edge of the basket for holding said connecting-piece to the upper part of the basket and having, below said integral parts, divergent downwardly-directed arms, the lower ends of which have engagement with the respective brace-wires below the reinforce along the rear edge of the basket, substantially as set forth.

Signed at Cincinnati, Ohio, this 13th day of August, 1901.

THOMAS G. MELISH.

Witnesses:
JOHN ELIAS JONES,
JOSEPH COX, Jr.